(12) United States Patent
Trissel et al.

(10) Patent No.: US 6,836,585 B2
(45) Date of Patent: Dec. 28, 2004

(54) PHOTONIC SWITCH

(75) Inventors: Richard G. Trissel, Cambria, CA (US); Edwin M. C. Childers, San Diego, CA (US)

(73) Assignee: Fiberyard, Inc., San Diego, CA (US)

( * ) Notice: Subject to any disclaimer, the term of this patent is extended or adjusted under 35 U.S.C. 154(b) by 0 days.

(21) Appl. No.: 10/199,691

(22) Filed: Jul. 18, 2002

(65) Prior Publication Data

US 2003/0026526 A1 Feb. 6, 2003

Related U.S. Application Data

(60) Provisional application No. 60/310,777, filed on Aug. 6, 2001.

(51) Int. Cl.[7] .................................. G02B 6/35
(52) U.S. Cl. .................... 385/18; 385/16; 385/31; 385/33
(58) Field of Search .................... 385/16–23, 31–35

(56) References Cited

U.S. PATENT DOCUMENTS

| 4,208,094 A | * | 6/1980 | Tomlinson et al. ........... 385/18 |
| 4,261,638 A | * | 4/1981 | Wagner ........................ 385/25 |
| 4,304,460 A | * | 12/1981 | Tanaka et al. ................ 385/22 |
| 4,626,066 A | * | 12/1986 | Levinson ...................... 385/22 |
| 4,630,254 A | | 12/1986 | Tseng |
| 4,938,555 A | * | 7/1990 | Savage ........................ 385/18 |
| 5,028,104 A | * | 7/1991 | Kokoshvili ................... 385/18 |
| 5,056,886 A | * | 10/1991 | Hoult ......................... 385/20 |
| 5,229,593 A | | 7/1993 | Cato |
| 5,416,627 A | | 5/1995 | Wilmoth |
| 5,777,768 A | | 7/1998 | Korevaar |
| 6,360,035 B1 | * | 3/2002 | Hurst et al. .................. 385/18 |
| 6,453,084 B1 | * | 9/2002 | Stanford et al. .............. 385/18 |
| 2001/0050787 A1 | * | 12/2001 | Crossland et al. ............ 359/15 |

FOREIGN PATENT DOCUMENTS

WO WO 200129599 A1 * 4/2001 ............ G02B/6/32

* cited by examiner

*Primary Examiner*—Juliana K. Kang
(74) *Attorney, Agent, or Firm*—Nydegger & Associates

(57) ABSTRACT

A photonic switch includes an array of waveguides (optical fibers) that are rigidly mounted together and arranged as a matrix. One waveguide acts as an input for the switch, and is used to transmit a light beam into free space. The other waveguides then function individually as outputs for the switch. Operationally, a switch connection is made by moving a steering mirror to direct the light beam from the input waveguide to a selected output waveguide. For one embodiment, the mirror is flat. For this embodiment the switch incorporates a collimating lens positioned between the array and the mirror, with the mirror at the telecentric stop of the lens. In another embodiment, the mirror has a concave surface.

15 Claims, 2 Drawing Sheets

PHOTONIC SWITCH

This application claims the benefit of U.S. Provisional Application No. 60/310,777 filed on Aug. 6, 2001.

FIELD OF THE INVENTION

The present invention pertains generally to optical switches. More particularly, the present invention pertains to optical switches that selectively route light beams on paths through free space. The present invention is particularly, but not exclusively, useful as an optical switch for operationally selecting a particular free-space light beam path from a plurality of possible beam paths.

BACKGROUND OF THE INVENTION

The transmission of data over a fiber optic telecommunications system has many advantages. For one, the data transmission is accomplished at the speed of light. Further, fiber optic systems are known to provide high potential bandwidths, and they generally involve lower costs than the more traditional use of copper. Nevertheless, despite these advantages, there are some significant design considerations to be confronted when fiber optics are to be used in a telecommunications system.

A very important design consideration for the manufacture and operation of a fiber optic telecommunications system involves the optical fiber itself. In general, optical fibers are constructed with a central core and a cladding that surrounds the core. More specifically, optical fibers are typically made of ultra-pure glass wherein the central core is of a higher refractive-index than the outer cladding. With this structure, it is well known that an optical fiber is capable of conducting modulated light signals by total internal reflections of the signals inside the core. Presently, fiber optic communications systems are in use that incorporate such fibers either individually, or as cables which include groups of fibers. In either case, one major advantage for using optical fibers in a telecommunications system is the fact that they typically have very small diameters and, therefore, they can be engineered to occupy minimal space.

In many communications applications, it happens that a data transmission circuit needs to be rerouted or reconfigured in some way. For the specific case where optical fibers are being used for the construction of the circuit, such a rerouting requires that the modulated light signals being carried on one optical fiber need to somehow be transferred to another optical fiber. Such a transfer effectively requires the light signals that emanate from an end of one optical fiber be effectively directed onto the end of another optical fiber. More specifically, this requires the light signals be directed into the core of the receiving optical fiber. On this point, the size advantage that was mentioned above, raises other issues. In perspective, the difficulty here becomes more apparent when one considers that the typical optical fiber has a core diameter of about nine microns (9 $\mu$m). Further, the total diameter of an optical fiber, for both the core and the cladding, is only about one hundred and twenty five microns (125 $\mu$m). For an efficient communication system it is necessary to direct a light beam into the core of the optical fiber with what is commonly referred to as "minimal insertion loss." To do this, most, if not all, of the light beam needs to be directed into the core of the optical fiber (i.e. onto a target of approximately 9 $\mu$m diameter).

In light of the above, it is an object of the present invention to provide a photonic switch that minimizes the insertion loss when the light signals in a data communications beam are transferred from one optical fiber to another optical fiber. Another object of the present invention is to provide a photonic switch wherein the input aperture from one optical fiber in the switch is substantially on the same surface as the output aperture into another optical fiber in the switch. Still another object of the present invention is to provide a photonic switch that allows the effective transfer of light signals emanating from one optical fiber, to be selectively directed to a particular receiving optical fiber, wherein the receiving optical fiber is one in a plurality of receiving optical fibers. Yet another object of the present invention is to provide a photonic switch that is simple to use, relatively easy to manufacture and comparatively cost effective.

SUMMARY OF THE PREFERRED EMBODIMENTS

A photonic switch in accordance with the present invention includes a beam steering mirror which is positioned to interact with a plurality of waveguides. Preferably, each individual waveguide is an optical fiber and the beam steering mirror is movable to selectively direct a light beam through free-space from one optical fiber to another for the purpose of completing an optical circuit.

For the photonic switch of the present invention, the waveguides are mounted together in a substantially planar array. More specifically, an end of each waveguide (optical fiber) is positioned in the planar array. Also, at least one of the waveguides, preferably one near the center of the array, is positioned to transmit a light beam through free space toward the mirror. The mirror then reflects the light beam from the mirror, back toward the array. Additionally, a mechanism is provided which can move the beam steering mirror so that the reflected light beam is directed to a particular waveguide (optical fiber) in the array. Thus, an optical connection can be made between the transmitting waveguide and the particular receiving waveguide in the array.

For one embodiment of the present invention, the beam steering mirror is substantially flat. For this embodiment, the beam steering mirror is located substantially at the telecentric stop of a collimating lens that is positioned between the mirror and the planar array of waveguides. Thus, the light beam passes through the collimating lens en route to the mirror from a transmitting waveguide in the planar array. The light beam is then reflected by the mirror back through the collimating lens toward the selected waveguide. For another embodiment, the beam steering mirror can have a concave (e.g. spherical) surface. For this embodiment, the array can have a compatible concave surface or be optically altered to minimize such a surface. In both embodiments, the mirror functions to complete an optical circuit by directing a light beam from one waveguide (optical fiber) in the array, to another waveguide (optical fiber) in the array with minimal insertion loss.

The mechanism mentioned above for moving the mirror needs to be capable of providing for specific movements of the mirror. Specifically, consider the mirror defines an x-y-z coordinate system. Then, for both embodiments of the present invention (i.e. the mirror is flat or concave), the mirror needs to be moveable in rotation through an angle $\theta$ around the x-axis with a range of approximately $\pm 10°$, and in rotation through an angle $\phi$ around the y-axis with a range of approximately $\pm 10°$. For purposes of the present invention, these movements can be accomplished by any mechanism known in the pertinent art. For example, such mechanisms for moving mirrors include magnetic actuators, mechanical actuators, piezo-electrical actuators and electrostatic and magnetic MEMS (Micro Electro Mechanical Systems). Further, for the embodiment of the present invention wherein the mirror has a concave surface, the mirror may need to be moveable along the z-axis.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
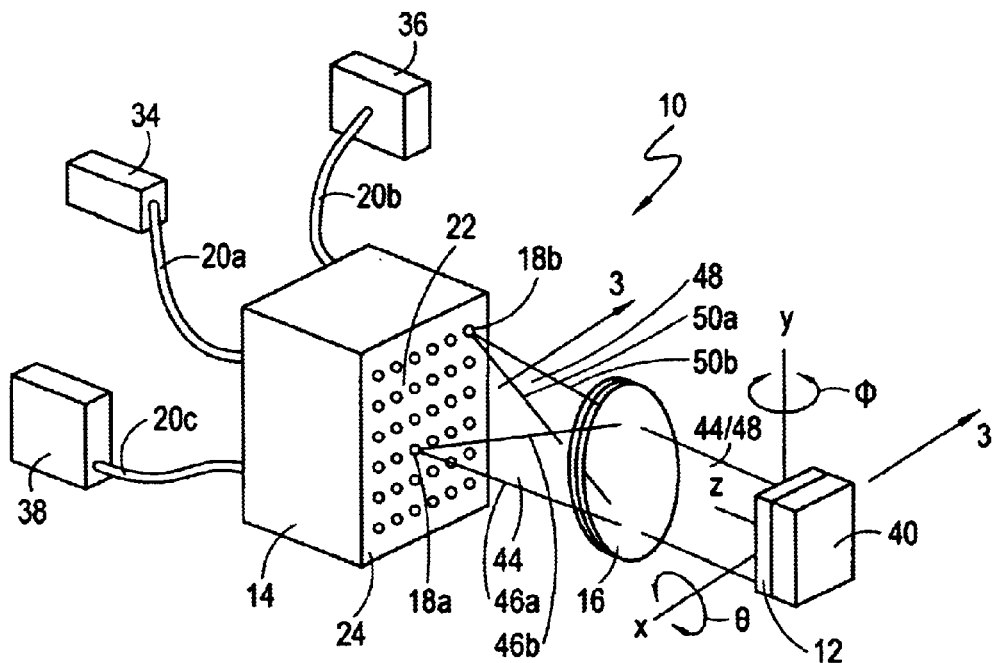
FIG. 1 is a perspective view of a photonic switch in accordance with the present invention.

Referring initially to FIG. 1, a photonic switch in accordance with the present invention is shown and generally designated 10. As shown, the switch 10 essentially includes a beam steering mirror 12, a fiber block 14, and a collimating lens 16 that is positioned between the mirror 12 and the fiber block 14. FIG. 1 also shows that a plurality of optical apertures 18 are positioned on the fiber block 14 to function as waveguides for the switch 10. Preferably, the optical apertures 18 are the exposed ends, or tips, of respective optical fibers 20. In FIG. 1, the apertures 18a–b, as well as the optical fibers 20a–c, are only exemplary.

For the purposes of the present invention, the optical apertures 18 are placed in an array 22 on the surface 24 of the fiber block 14. In the preferred embodiment of the present invention, the surface 24 is substantially flat and, therefore, the optical apertures 18 are substantially co-planar. As indicated in FIG. 1, the apertures 18 are arranged in columns and rows and, importantly, the location of each individual aperture 18 in the array 22 will have a known location relative to all of the other individual apertures 18. For example, the location of aperture 18b relative to the aperture 18a is known.

Figure 2:
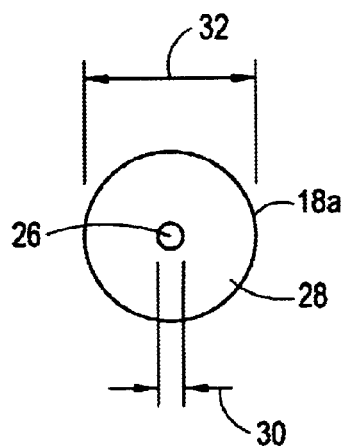
FIG. 2 is a plan view of an end of an optical fiber as used for the photonic switch of the present invention.

Referring now to FIG. 2, the aperture 18a is shown in plan view to illustrate the general structural details of the optical fiber 20a (i.e. waveguide). More specifically, by considering the exemplary aperture 18a, it is seen that each optical fiber 20 includes a core 26 that is surrounded by a cladding 28. The particular glass that is used in the manufacture of the core 26 and cladding 28 is a matter of design choice and can include any particular construction well known in the pertinent art. In any event, it is typical that the core 26 of an optical fiber 20 will have a relatively small diameter 30 (e.g. nine microns) and the overall diameter 32 of the optical fiber 20 will be around one hundred and twenty five microns.

Returning now to FIG. 1, it will be appreciated that the switch 10 is connected, via optical fibers 20, to various devices. As shown, switch 10 is connected to the devices 34, 36 and 38 via respective optical fiber 20a, 20b and 20c.

Again, these connections are only exemplary and as implied in FIG. 1, there can be many more such connections.

Still referring to FIG. 1, it will be seen that the switch 10 includes an actuator 40 that is operationally attached to the beam steering mirror 12. As intended for the present invention, the actuator 40 is capable of moving the mirror 12 in rotation through an angle θ around the x-axis, and in rotation through an angle φ around the y-axis. More specifically, the extent of these rotations are such that the angle θ is moveable through a range of ±10°, and the angle φ is moveable through a range of ±10°. In addition to these rotational movements, it may be desirable that the mirror 12 be moveable in translation back and forth along the z-axis.

Figure 3A:
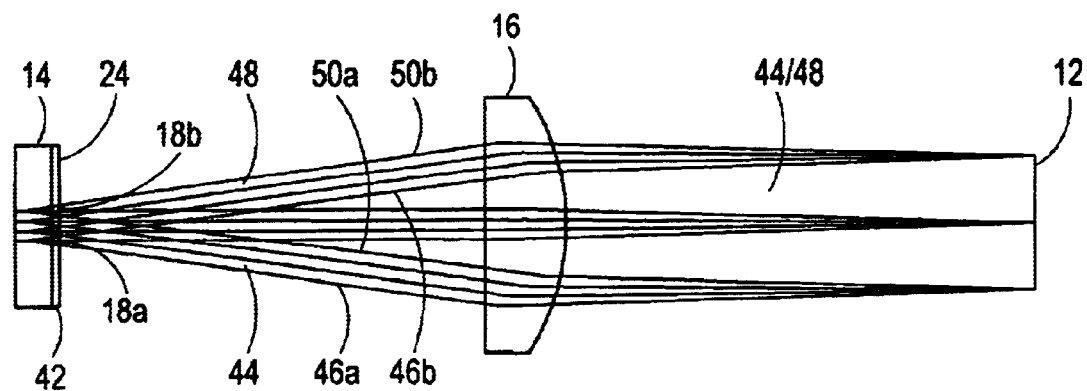
FIG. 3A is a schematic side-elevation view of the optical arrangement for a preferred embodiment of the present invention, as seen along the line 3—3 in FIG. 1.
Figure 3B:
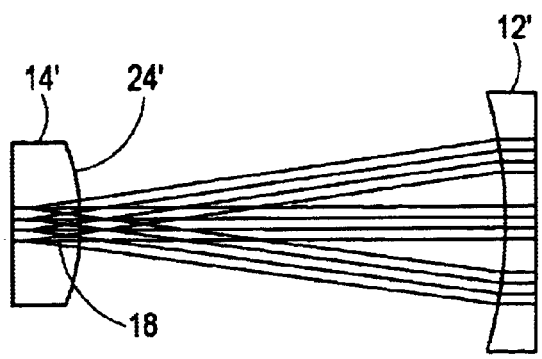
FIG. 3B is a schematic side-elevation view of the optical arrangement for an alternate embodiment of the present invention, as seen along the line 3—3 in FIG. 1.

In FIG. 3A, it will be seen that for the preferred embodiment of the switch 10, wherein the surface 24 is substantially flat, a field flattening element 42 can be positioned on the surface 24. The purpose here is to provide a refractive effect so that a light beam, as it is incident on an aperture 18, will be directed into the core 26 of the aperture 18 at an angle that is more nearly normal to the surface 24. The intended consequence of this is to minimize any insertion loss as a light beam enters the core 26 of an optical fiber 20. In an alternate embodiment for the switch 10, as shown in FIG. 3B, this same consequence can be obtained by making the surface 24' of the fiber block 14' convex. In this alternate embodiment, the beam steering mirror 12' will have a concave reflective surface that is compatible with the curvature of the surface 24'.

The operation of switch 10 for the present invention will, perhaps, be best appreciated by cross-referencing FIG. 1 with FIG. 3A. With this cross-referencing, consider that the light beam 44 emanates (is transmitted) from the aperture 18a of optical fiber 20a. As shown, this light beam 44 is defined by the boundary lines 46a and 46b. After leaving the aperture 18a, the light beam 44 then passes through the collimating lens 16 and is directed toward the beam steering mirror 12. Importantly, the beam steering mirror 12 is positioned at the telecentric stop of the collimating lens 16. At the mirror 12, the light beam 44 is reflected back toward the collimating lens 16 as a reflected light beam 48. For purposes of this disclosure, the light beam 48 is defined by the boundary lines 50a and 50b.

As indicated above, the actuator 40 is operated to tip (change in angle θ) and tilt (change in angle φ) the mirror 12 to selectively establish the position of the beam steering mirror 12. Consequently, actuator 40 can be operated to determine the selected direction in which the light beam 48 is reflected from the mirror 12. In this example, the light beam 48 is being directed so that as it passes back through the collimating lens, 16 it (i.e. the light beam 48) is directed toward the aperture 18b. The result in this example is that the device 34 is connected in communication with the device 36. As will be appreciated by the skilled artisan, the actuator 40 can be moved as desired by the operator to connect any of the apertures 18 with another of the apertures 18 to complete a fiber optic telecommunications link.

While the particular photonic switch as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A photonic switch which comprises:

a collimating lens having a telecentric stop, said telecentric stop being external to said collimating lens;

a beam steering mirror located substantially at the telecentric stop;

a plurality of waveguides mounted in an array and terminating at a substantially flat surface;

at least one said waveguide of said array positioned for transmitting a light beam through said collimating lens toward said mirror; and a means for moving said mirror to reflect the light beam therefrom toward a selected said waveguide in said array.

2. A switch as recited in claim 1 wherein said switch further comprises a field flattening element positioned on said flat surface of said array.

3. A switch as recited in claim 1 wherein said mirror defines an x-y-z coordinate system, and wherein said mirror is moveable in rotation through an angle θ around the x-axis, and in rotation through an angle φ around the y-axis.

4. A switch as recited in claim 3 wherein the angle θ is moveable through a range of ±10°, and the angle φ is moveable through a range of ±10°.

5. A switch as recited in claim 3 wherein said mirror is moveable along the z-axis.

6. A switch as recited in claim 1 wherein said mirror is substantially flat.

7. A switch as recited in claim 1 wherein said mirror reflects the light beam through said collimating lens.

8. A switch as recited in claim 1 wherein said array is in a linear configuration for said plurality of waveguides.

9. A system for connecting a first optical element in light communication with a selected second optical element via a light beam transmitted through free space, where said system comprises:

a means for rigidly mounting said first optical element and a plurality of said second optical elements in an array;

a means for transmitting the light beam from said first optical element into free space along a first beam path;

a beam steering mirror for reflecting the transmitted light beam to create a reflected beam traveling along a second beam path toward said selected second optical element and wherein said second beam path is substantially parallel to said first beam path; and a collimating lens positioned between said mirror and said array wherein the light beam is transmitted from said first optical element through said collimating lens toward said mirror, and reflected from said mirror back through said collimating lens toward said selected second optical element, wherein said collimating lens has a telecentric stop and said mirror is located substantially at the telecentric stop.

10. A system as recited in claim 9 wherein said first optical element and said plurality of second optical elements are waveguides.

11. A system as recited in claim 9 wherein said first optical element and said plurality of second optical elements are optical fibers, and said mounting means is a fiber block.

12. A system as recited in claim 9 wherein said mirror defines an x-y-z coordinate system, and wherein said mirror is moveable in rotation through an angle θ around the x-axis, and in rotation through an angle φ around the y-axis, and further wherein the angle θ is moveable through a range of ±10°, and the angle φ is moveable through a range of ±10°.

13. A method for connecting a first optical element in light communication with a selected second optical element via a light beam transmitted through free space, wherein said method comprises the steps of:

rigidly mounting said first optical element and a plurality of said second optical elements in an array;

transmitting the light beam from said first optical element into free space along a first beam path; and reflecting the light beam to create a reflected beam traveling along a second beam path toward said selected second optical element and substantially parallel to said first beam path and wherein said reflecting step comprises locating a mirror at a distance from said array, and positioning a collimating lens between said mirror and said array wherein the light beam is transmitted from said first optical element through said collimating lens toward said mirror, and is reflected from said mirror back through said collimating lens toward said selected second optical element, and further wherein the collimating lens has a telecentric stop and the mirror is located at the telecentric stop.

14. A method as recited in claim 13 wherein said mirror defines an x-y-z coordinate system, and said directing step comprises the steps of:

moving said mirror in rotation through an angle θ around the x-axis; and moving said mirror in rotation through an angle φ around the y-axis.

15. A method as recited in claim 13 wherein said first optical element and said plurality of second optical elements are optical fibers.

* * * * *

UNITED STATES PATENT AND TRADEMARK OFFICE
CERTIFICATE OF CORRECTION

PATENT NO. : 6,836,585 B2
APPLICATION NO. : 10/199691
DATED : December 28, 2004
INVENTOR(S) : Richard G. Trissell, Edwin M. C. Childers and Stephen W. Horton It is certified that error appears in the above-identified patent and that said Letters Patent is hereby corrected as shown below:

On the title page, item [75]: under Inventors
INSERT
-- Stephen W. Horton --

Signed and Sealed this

Fourth Day of September, 2007

JON W. DUDAS
*Director of the United States Patent and Trademark Office*